Oct. 29, 1968   K. MÄGERLE   3,407,544
CLAMPING DEVICE
Filed April 19, 1965   5 Sheets-Sheet 5
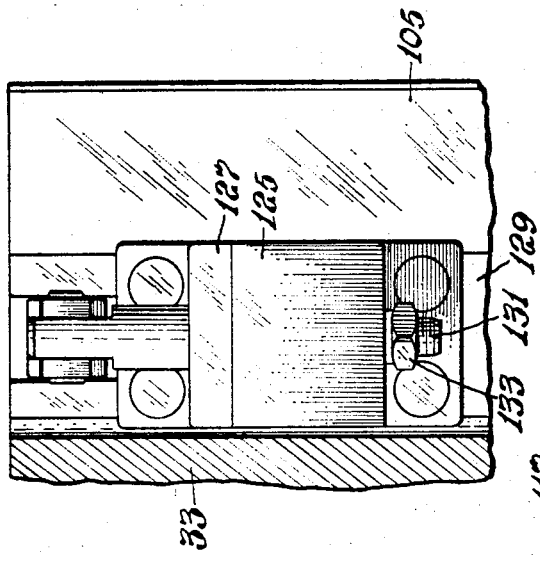
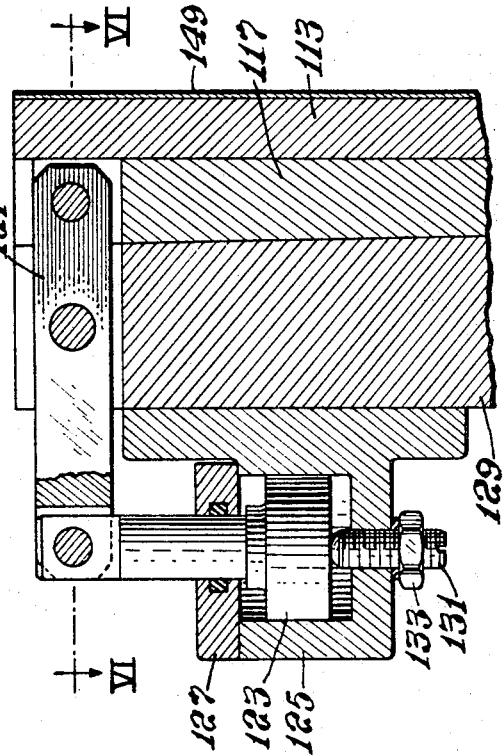
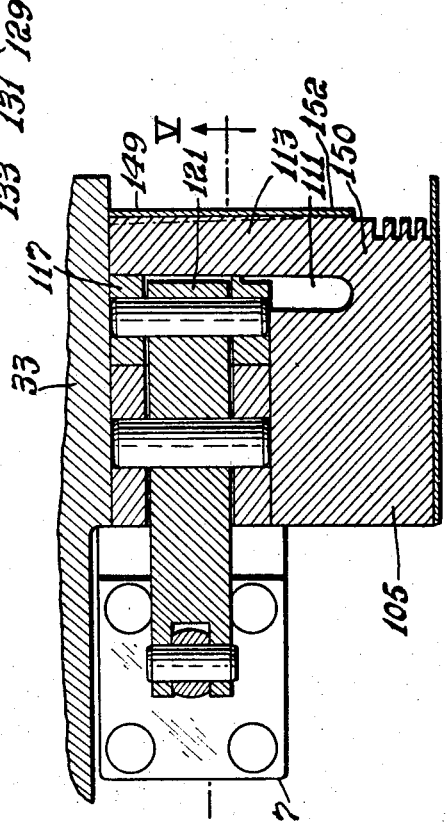
INVENTOR.
Karl Mägerle
BY United States Patent Office 3,407,544
Patented Oct. 29, 1968

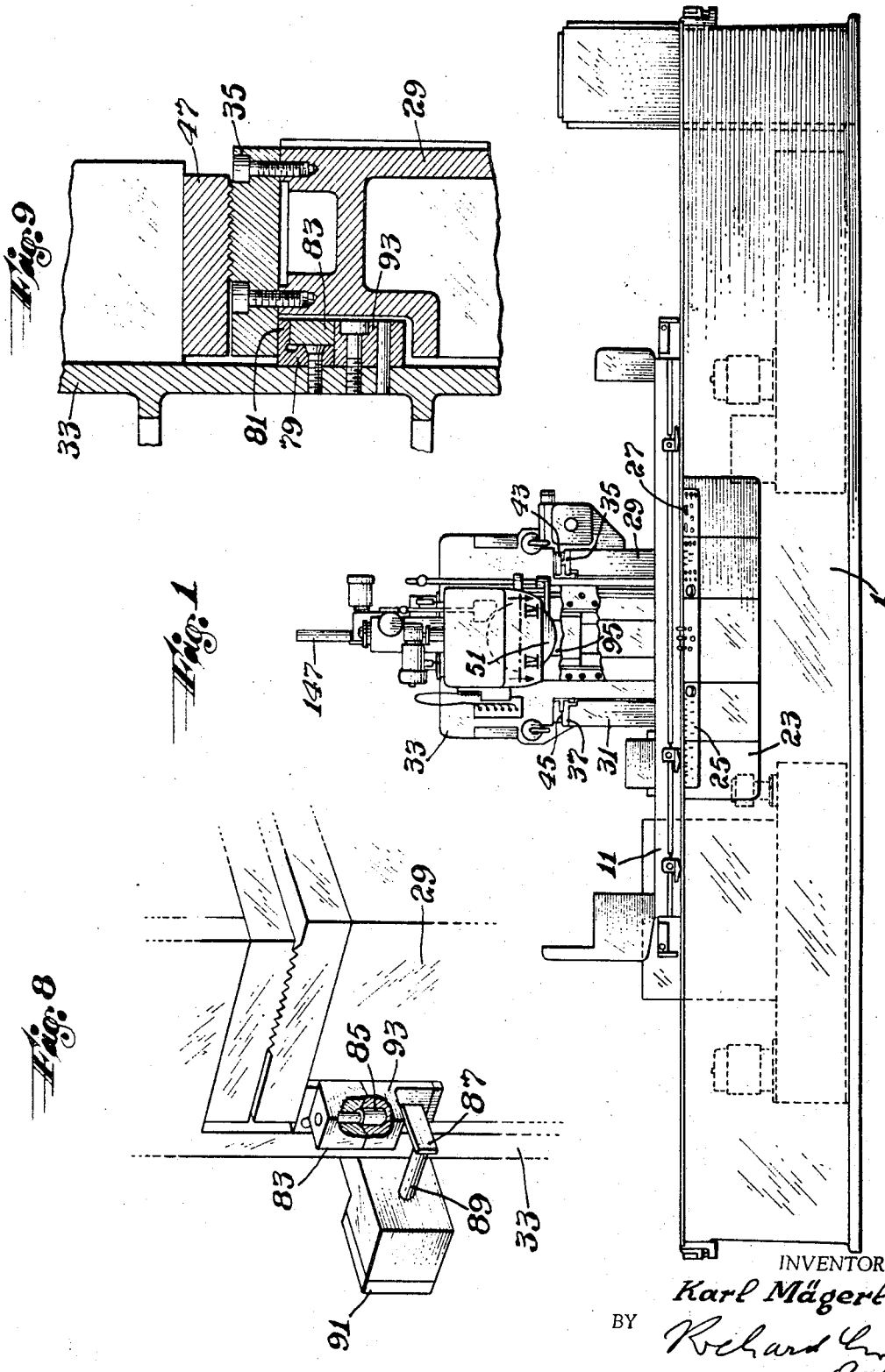

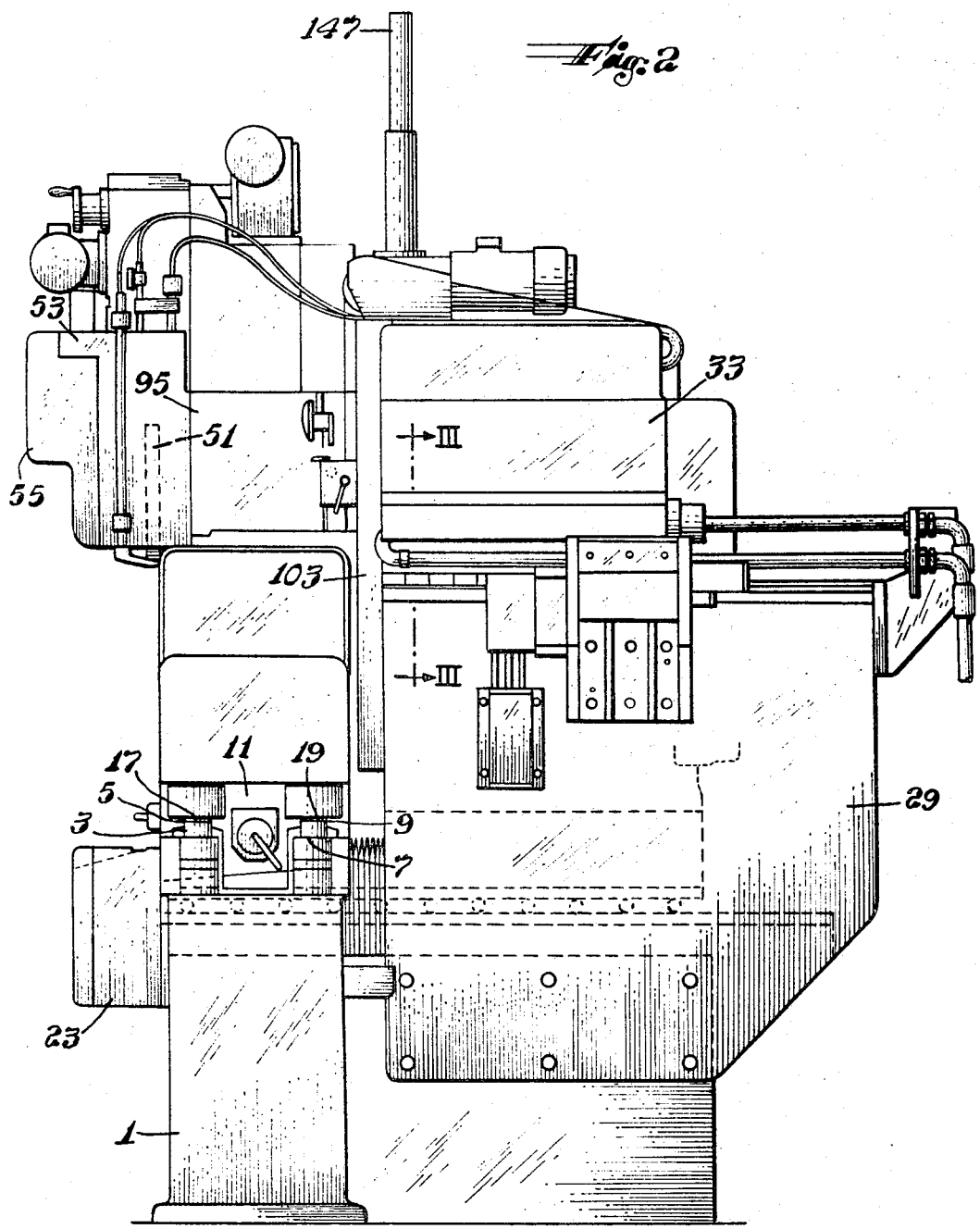

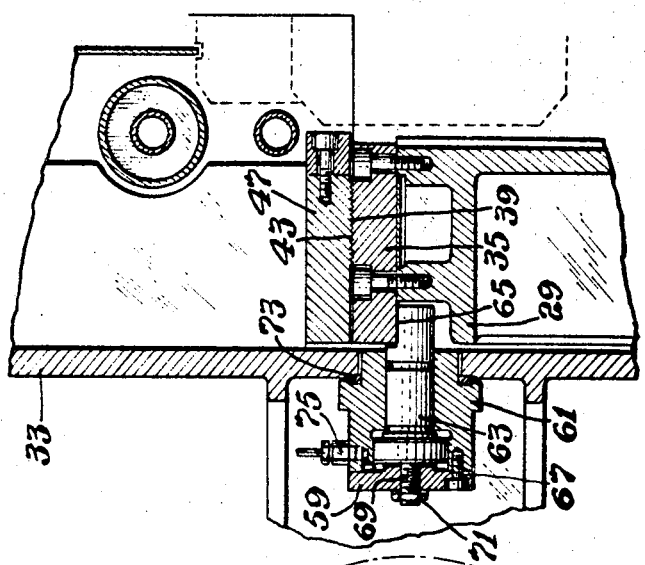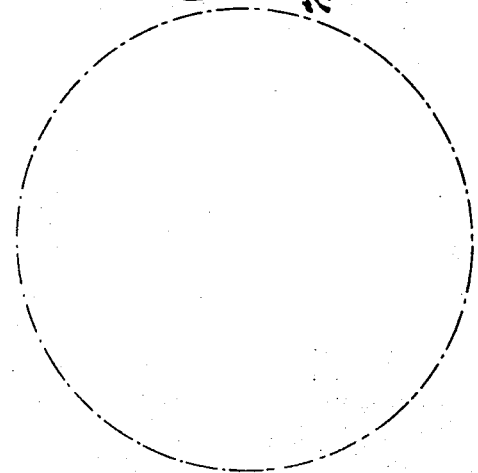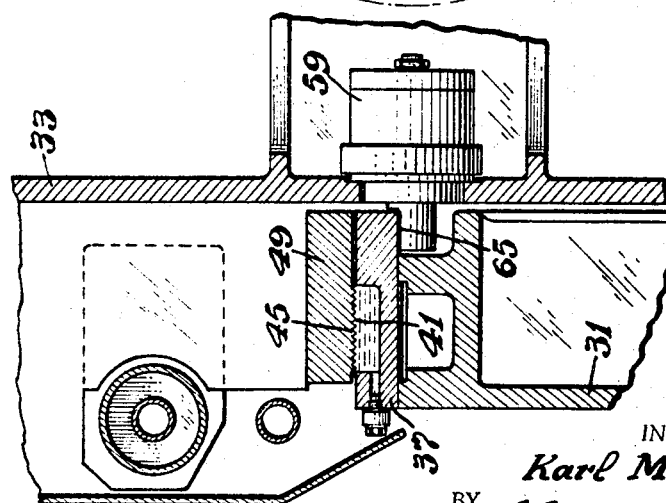

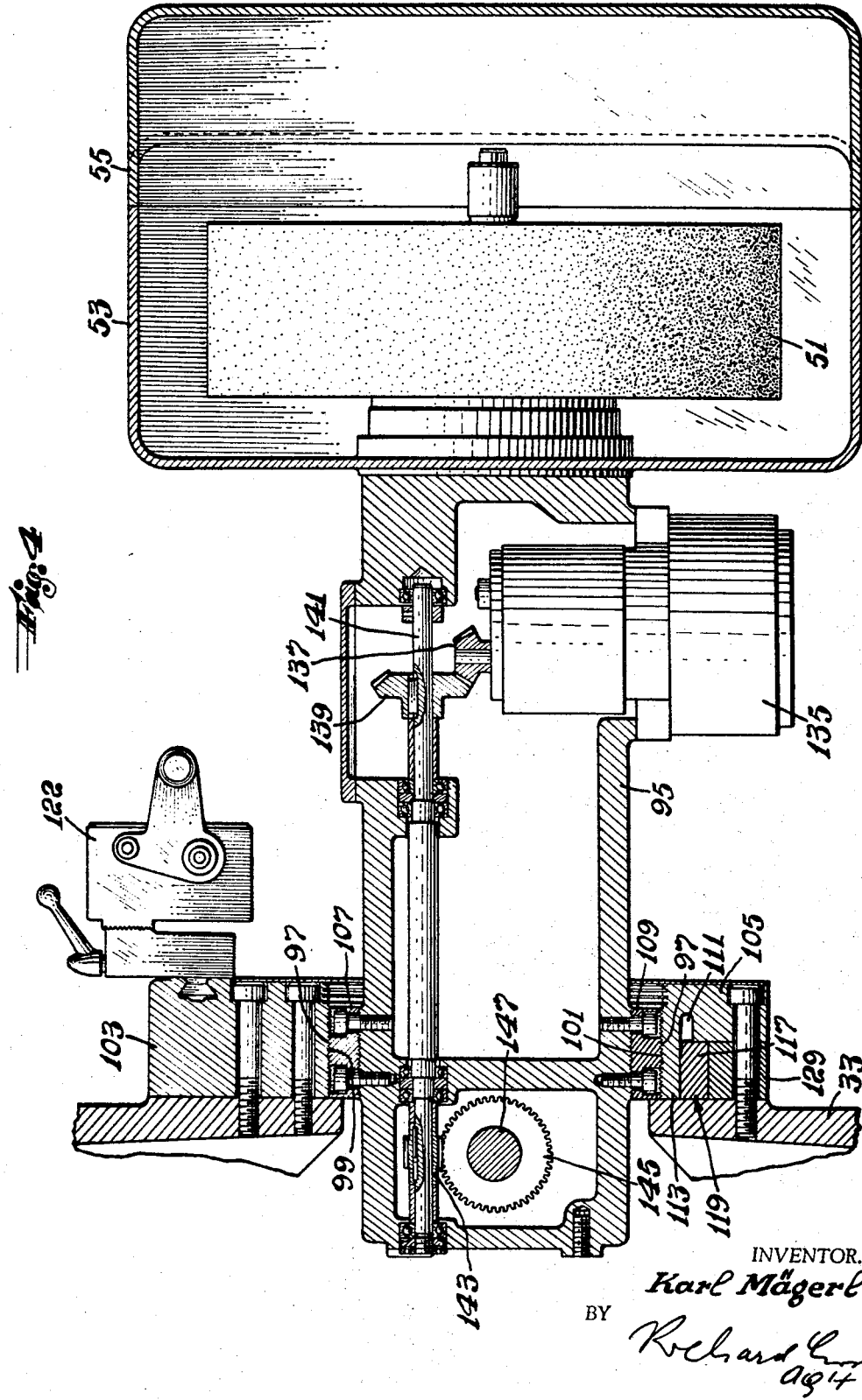

3,407,544
CLAMPING DEVICE
Karl Mägerle, 1 Im Vordern Erb,
Kusnacht, Zurich, Switzerland
Filed Apr. 19, 1965, Ser. No. 449,142
Claims priority, application Switzerland, Apr. 25, 1964,
5,424/64
4 Claims. (Cl. 51—166)

ABSTRACT OF THE DISCLOSURE

The clearance between the bearing faces of a fixed part and of a slidably engaged movable part of a machine tool is adjusted by supporting one of the bearing faces on the flange of a bar of L-shaped cross section, and by resiliently bending the flange toward the other bearing face by means of a wedge driven between the flange and a rigid backing element. The normally movable part may thereby be clamped fast to the fixed part.

My invention relates to clamping devices, particularly for machine tools, with a normally stationary part and a movable part. On the majority of machine tools, parts have to be moved in different directions. This requires different guide-ways for these parts. During the actual machining process, however, usually only one sole movement in one direction is performed. In present machines of this kind a disadvantage is that the play between those parts which, during the machining process, have to be brought, into an immovable, fixed position cannot completely be removed in this position so that the accuracy of the machine during the machining process is impaired.

The purpose of my invention is to clamp those parts which during or in certain phases of the machining operation are not required to be moved in order to increase the stability of the machine, to increase the machining accuracy and to avoid as far as is possible the building-up of vibrations during machining.

The clamping device according to my invention is characterized in that in the clamped position of the device at least one of the parts participating in the clamping is elastically deformed.

The following specification, of which the drawings form a part, describes my invention in this preferred form.

In the drawings:

FIG. 1 is a front elevation of a precision surface profile grinding machine;

FIG. 2 is a side elevation of the machine shown in FIG. 1;

FIG. 3 is a cross section of the machine column through III—III of FIG. 2;

FIG. 4 is a horizontal section of the wheelhead of the machine through IV—IV of FIG. 1;

FIG. 5 is a vertical section of the clamping device for the vertical guide-way through V—V of FIG. 6;

FIG. 6 is a horizontal section through VI—VI of FIG. 5;

FIG. 7 is a side elevation of the clamping device according to FIGS. 5 and 6;

FIG. 8 is an isometric view of another form of hydraulic clamping device similar to that shown in FIG. 3; and FIG. 9 is a cross section of the arrangement shown in FIG. 8 similar to the section shown through III—III of FIG. 2.

The precision surface-profile grinding machine shown in FIGS. 1 and 2 has a bed 1 the upper surface of which is built with longitudinal flat way strips 3 with flat way surfaces 5 and similar serrated guide-way strips 7 with serrated guide-way surface 9 arranged parallel to the flat way strips 3. The machine bed 1 serves, among other things, to carry a worktable 11 slidable along the length of the bed the said worktable being provided with T-slots for the holding of a workpiece.

The underside of the worktable 11 is provided with guide-ways 17 and 19 which correspond with the flat way surface 5 and the serrated way surface 9 respectively.

The movement of the worktable 11 upon the machine bed 1 functions hydraulically.

On the front side of the machine bed 1 is fitted a control panel 23 as shown in FIG. 1. One part of the said control panel 23 is reserved for preselection switches 25 and the other part for operating switches 27. The control panel 23 is protected from dirt by a plexiglass cover.

To the rear of the machine bed 1 and fixed to same with screws are two supports 29 and 31 serving to carry a column 33. The supports 29 and 31 each have a strip 35 and 37 respectively on their top side having serrated ways surfaces 39 and 41, as seen in FIG. 3.

Corresponding surfaces 43 and 45 of strips 47 and 49 which are in turn fitted to the machine column 33 engage with serrated way surfaces 39 and 41.

Parts of the machine which for setting purposes are required to be moveable can during the machining process be clamped in their working position so that all play in the locked guideways can be eliminated and the accuracy of the machining can be increased to a hitherto unknown degree.

In order to obtain the highest possible accuracy in, for example, grinding which can only be achieved by eliminating the play between the fixed part of the machine i.e. the supports 29 and 31 and the machine column 33 which slides horizontally forward and backward on the serrated way surfaces 39, 41, 43 and 45 two hydraulic clamping devices 59 are fitted onto each side of the machine. These devices 59 have clamping cylinders 61 which are bolted onto the column 33. In these cylinders 61 are fitted slideable clamping pistons 63 whose one end carries a clamping face 65 which slopes obliquely toward the piston axis.

This clamping face 65 matingly engages a face on the transverse serrated way strip 35 and strip 37 on the other side of the machine.

The clamping cylinder 61 is fitted with a cylinder cover 67 in which is an adjusting screw 69. The screw 69 limits the return movement of the clamping piston 63. This movement controls the clearance between both clamping faces when the clamping device is not in operation. The adjusting screw 69 is locked with a locking nut 71.

In order to eliminate the transfer of heat from the clamping device 59 to the machine column 33 an insulating ring 73, as shown in FIG. 3, is inserted between the column 33 and the clamping device 59. The inside of the clamping cylinder 61 is connected with a fitting 75 to the same hydraulic system, not otherwise shown, which controls the movement of the worktable 11 and the column 33. The non-illustrated control valves work so that upon commencement of the machining operation pressure oil is fed via hydraulic fitting 75 to the clamping cylinder 61, forcing the clamping piston 63 with the clamping face 65 against the serrated way strips 35 and 37 respectively. In order to reduce the friction on the clamping face 65 of the piston 63 a dry lubricating medium such as molybdenum disulfide (Molikot) is recommended. In this way the whole column 33 is pulled down and clamped onto the serrated way strips 35 and 37. The serrated way surfaces 39 and 43 and 41 and 45 respectively are thus brought into firm contact, so that a fixed connection, entirely free of play is made.

All possible inaccuracies due to play between these parts are thus eliminated which decidedly helps in the achievement of high machining accuracy and also avoids rapid vibrational wear of the guide-way surfaces, increasing the life of the machine under maintenance of the highest machining accuracy to a much higher degree than hitherto known. When the column 33 is to be traversed relative to the supports 29 and 31 the clamping piston 36 is automatically reversed as pressure oil is fed via the appropriate fitting 75 to the opposite side of the clamping piston 63 thus pushing this out of its clamping position outwards into its free position. Now the column 33 can carry out its intended traverse at the end of which the clamping piston 63 automatically returns to the clamping position so that the machining process can be continued.

FIGS. 8 and 9 show another method of clamping than that shown in FIG. 3. In the clamping device in this arrangement a bar 79 of approximately L-shaped cross section is bolted onto the column 33 so that the outer face of its elastic flange 81 rests on the underside of the guide-way strips 35 and 37 respectively. A clamping wedge 83 is interposed between an inner face of the flange 81 and a bearing or supporting strip 93 and is connected by a motion transmitting eccentric pin 85 and a lever 87 to the cylinder 91 of a hydraulic motor. The clamping wedge 83 rests on the supporting strip 93 which is bolted to the column 33. In order to clamp the column 33 pressure oil is fed into the hydraulic cylinder 91 moving the piston 89 so that the lever 87 and the eccentric pin 85 are pivoted about an axis fixed relative to the column 33. The lower part of the pin 85 (FIG. 8) is journaled in the strip 93 and the free eccentric end is located in the clamping wedge 83. Through the swivelling of the pin 85 the wedge 83 is pushed into the clamping position and the flange 81 is elastically distorted. The wheelhead 95 slides vertically on the column 33 between two serrated way surfaces 97 and 99 and 101 respectively as shown in FIG. 4. It carries a grinding wheel 51 protected by a guard 53 having a removable cover 55. The serrated way or guide surfaces 97 are on steel bars 103 and 105 which are bolted to the column 33. These guideway surfaces 97 are therefore fixed. The strips 107 and 109 which are bolted onto the slideable wheelhead have serrated way or contact surfaces 99 and 101 parallel to the surfaces 97. The bar 103 is of heavy section and forms a rigid bearing for the slideable wheelhead 95. The corresponding bar 105 on the opposite side of the wheelhead 95 is of L-shaped section so that an elastic flange 113 is separated from the rigid web part of the bar 105 by a groove 111. This bar as previously mentioned is also bolted to the column 33. Further a spacing strip 129 is so foreseen that a gap remains between this and the flange 113 to accommodate a slideable taper wedge 117. The spacing strip 129 is fixed firmly to the column 33 and provides on one side an accurate mounting surface for the bar 105 and on another side an accurate bearing surface for the taper wedge 117. The wedge tapers at an angle small enough to be self-holding, that is, to be retained by friction in stationary engagement with the rear surface of the flange 113 when the surfaces 97, 101 are clampingly engaged.

The taper wedge 117 which constitutes a clamping device for the vertical guideways has in its upper end a slot (FIGS. 5 to 7) and is connected via a lever 121 to a hydraulic piston 123 which moves under hydraulic pressure backwards and forwards in a clamping cylinder 125 which is sealed by a coverplate 127. The clamping cylinder 125 is fixed to the spacing strip 129. In the bottom of the cylinder 125 is an adjusting screw 131 which can be locked by the nut 133 and serves to limit the reversing movement of the taper wedge 117.

As is shown in FIG. 4, the vertical feed of the wheelhead 95 is actuated by a motor 135 via a gear unit and then via bevel gears 137 and 139, a shaft 141 which carries a worm 143. The worm 143 mates with a wormwheel 145 which is in turn fixed to the vertical spindle 147.

During the grinding process the hydraulic system is so operated that pressure oil is fed to the underside of the piston 123 thus moving same and forcing the taper wedge 117 into its clamping position between the spacing strip 129 and the flange 113. As this flange 113 is designed to distort according to Hook's Law, i.e. within the elastic limit, across the neck 150 towards the wheelhead 95 and the serrated way surfaces 97 of the strip 109, and as the opposite serrated way unit 97 and 99 due to the rigidity of the bar 103 also forms a firm bearing surface, the whole wheelhead 95 is clamped securely without any play whatsoever. During the actual grinding operation then, play in the vertical ways is completely eliminated.

When the clamping device is not in operation the play or clearance in the guideways is extremely small and can even at one point be eliminated as the clamping operation depends only upon the elastic distortion of a metal strip resulting only in a very small movement. The movement of the clamping flange 113 is at right angles to the direction of movement of the part being clamped and therefore there can be no resulting force tending to move this part, i.e. the wheelhead 95, thus the danger of the part being moved as the clamping is operated is eliminated.

This kind of clamping arrangement using the elastic distortion of steel makes possible the use of preloading of the flange 113 so that it swings about the neck 150 whose cross section is smaller than that of the flange 113 and of the web part of the bar 103 from the opposing guideway surface 101 to its normal position as shown by the dot-dash line. At the neck itself no movement takes place so that a small portion e.g. one serration on the flange 113 (FIG. 6) always remains in contact with the opposing strip 109, without any clearance, while the remainder of the guideway surface is completely free. Even though the guideways are still free of play the sliding friction is now very small. The two surfaces 101 and 97 form open jaws with the neck 150 as a fulcrum. When machining a workpiece a downfeed, according to the amount of metal to be removed, has to be made by the wheelhead. At this moment the grinding wheel is not in contact with the workpiece. To allow the downfeed to be carried out the clamping has to be released. This is done automatically e.g. when surface grinding at each reversal of the cross-traverse the pressure oil in the cylinder 125 is also reversed and now pushes down on the upper side of the piston 123 forcing this down into its lowest position. The lever 121 is also pulled down and this lifts the taper wedge 117 out of its clamping position. The firm contact between the wheelhead 95 and the column 33 is now eased and the wheelhead 95 can now be moved easily relative to the column 33 via the serrated way surfaces 97, 99 and 101. The impulse for the feed motor 135 follows the clamping release. The drive through the bevel gears 137 and 139 and the worm and wormwheel 143 and 145 turns the downfeed spindle 147 whose upper end is threaded (not shown). As the spindle 147 is borne in the wheelhead 95 and its nut is held in the column 33 the turning of the spindle results in a lifting or lowering of the wheelhead. Upon completion of the feed increment the pressure oil is reversed once more so that the taper wedge 117 is forced into the clamped position and the wheelhead 95 is once again clamped rigidly to the column 33.

I claim:

1. In a machine tool having a normally stationary part having an engaging face, a second part having an engaging face approximately parallel to said face of said first part and engageable therewith for sliding movement of said second part on said first part, clamping means for abuttingly engaging said faces under a pressure sufficient for preventing said movement, and means for holding a tool and a workpiece in fixed spatial relationship to said parts respectively, the improvement in the clamping means which comprises:

(a) one of said parts including a bearing member and a unitary metallic member of substantially L-shaped cross section in a plane transverse to said engaging faces,
  (1) said metallic member having a flange portion, a web portion, and a resiliently deformable neck portion integrally connecting said flange and web portion,
  (2) the cross section of said neck portion in said plane being smaller than the cross section of said web portion,
  (3) said engaging face of said one part being an outer face of said flange portion, the flange portion having an inner face spacedly opposite said bearing member;
(b) fastening means fixedly fastening said web portion to said bearing member;
(c) a wedge member movably interposed between said inner face and said bearing member and tapering in a direction transverse of said plane; and
(d) actuating means for moving said wedge member in said transverse direction and for thereby resiliently deforming said neck portion and engaging said outer face with the engaging face of the other one of said parts.

2. In a machine tool as set forth in claim 1, said actuating means including a hydraulic motor having a cylinder portion and a piston portion movably received in said cylinder portion, a motion transmitting member mounted on said one part for pivotal movement about a fixed axis, and connecting means connecting respective portions of said motion transmitting member to one of said portions of said motor and to said wedge member respectively, the other portion of said motor being fixedly fastened to said one part.

3. In a machine tool as set forth in claim 2, said wedge member tapering in said transverse direction at an angle small enough so that said wedge member is retained by friction in stationary engagement with said inner face when said engaging faces are engaged under said sufficient pressure.

4. In a machine tool as set forth in claim 3, said actuating means including stop means for limiting movement of said wedge member in said transverse direction.

References Cited

UNITED STATES PATENTS

| | | |
|---|---|---|
| 2,745,167 | 5/1956 | Cross. |
| 2,768,406 | 10/1956 | Carle _____ 308—3 |
| 2,941,491 | 6/1960 | Knost _____ 269—20 |
| 3,099,873 | 8/1963 | Brainard. |
| 1,813,355 | 7/1931 | Lucas _____ 308—3 X |
| 2,293,880 | 8/1942 | Armitoge _____ 51—240 X |
| 2,365,078 | 12/1944 | Hoier _____ 29—1.5 X |
| 2,367,957 | 1/1945 | Metcalfe _____ 29—1.5 X |
| 2,441,533 | 5/1948 | Montgomery _____ 51—240 |
| 2,449,327 | 9/1948 | Schlitters _____ 308—3 |
| 2,914,362 | 11/1959 | Ott _____ 308—3 |

FOREIGN PATENTS

| | | |
|---|---|---|
| 921,166 | 4/1947 | France. |
| 816,050 | 7/1959 | Great Britain. |
| 311,341 | 11/1955 | Switzerland. |

MARTIN P. SCHWADRON, *Primary Examiner.*

L. L. JOHNSON, *Assistant Examiner.*